Aug. 8, 1950
S. SMITH
2,517,729
PIPE WRENCH HAVING ANTISWING DETENT
FOR ADJUSTABLE OUTER JAWS
Filed June 1, 1948
2 Sheets-Sheet 1
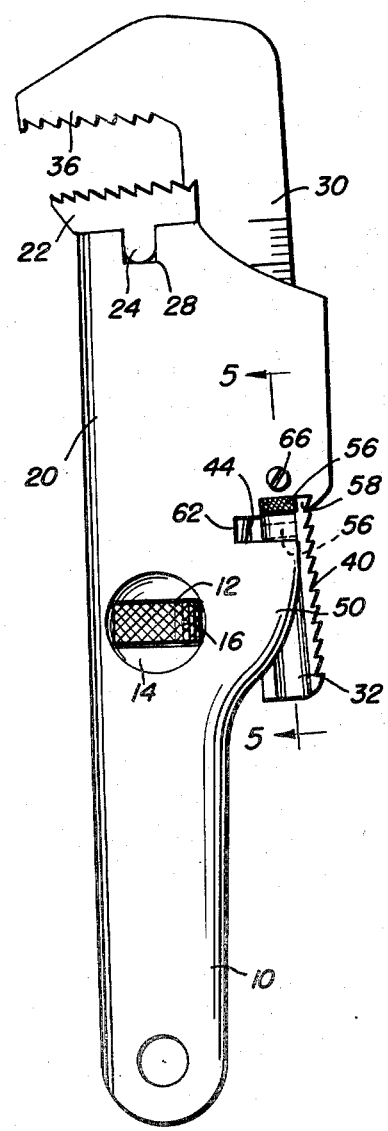
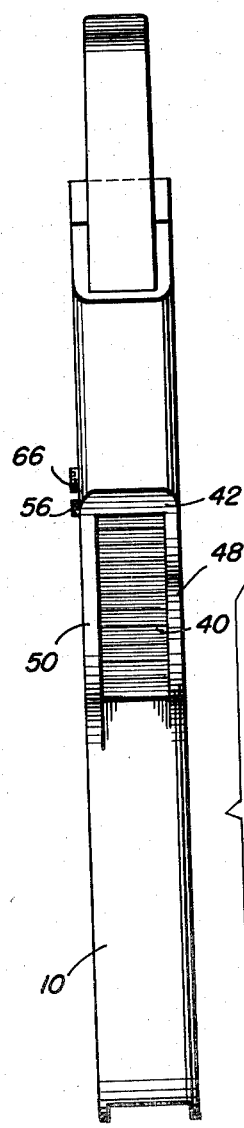
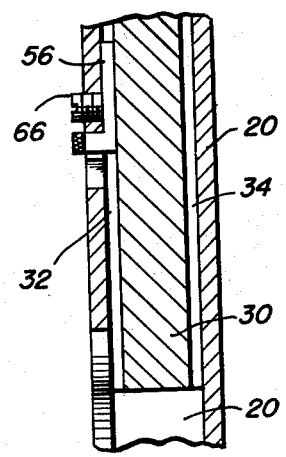
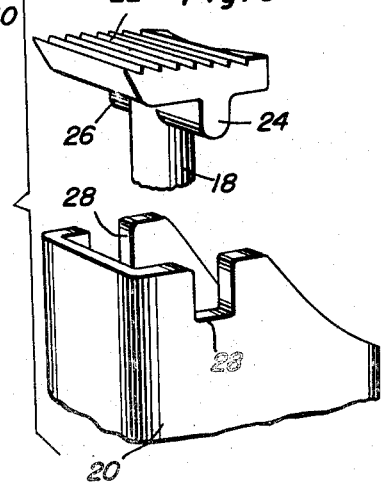
Simon Smith
INVENTOR.
BY *Clarence A. O'Brien
and Harvey B. Jacobson*
Attorneys Aug. 8, 1950

S. SMITH 2,517,729

PIPE WRENCH HAVING ANTISWING DETENT
FOR ADJUSTABLE OUTER JAWS

Filed June 1, 1948

Simon Smith
INVENTOR.

BY *Clarence A. O'Brien*
*and Harvey B. Jackson*
Attorneys

Patented Aug. 8, 1950

2,517,729

UNITED STATES PATENT OFFICE 2,517,729

PIPE WRENCH HAVING ANTISWING DETENT FOR ADJUSTABLE OUTER JAWS

Simon Smith, Beaumont, Tex.

Application June 1, 1948, Serial No. 30,480

2 Claims. (Cl. 81—100)

This invention relates to novel and useful improvements in tools.

An object of this invention is to clampingly engage a pipe, nut, bar or the like by improved clamping means which includes a pair of adjustable jaws carried by a pair of adjustable shanks, one of which is resiliently urged toward a locking pin which is fixed on the wrench body or housing, said locking pin being adjustable and forming a means for limiting rocking movement of this shank.

Ancillary objects and features of novelty will become apparent to those skilled in the art and following the description of the preferred form of the invention, illustrated in the accompanying drawings, wherein:

Figure 1 is an elevational view of one form of the invention;

Figure 2 is a back view of the invention shown in Figure 1;

Figure 5 is a sectional view taken on the line 5—5 of Figure 1 and in the direction of the arrows;

Figure 6 is an exploded perspective view of the first shank and jaw with a portion of the housing.

Figure 3:
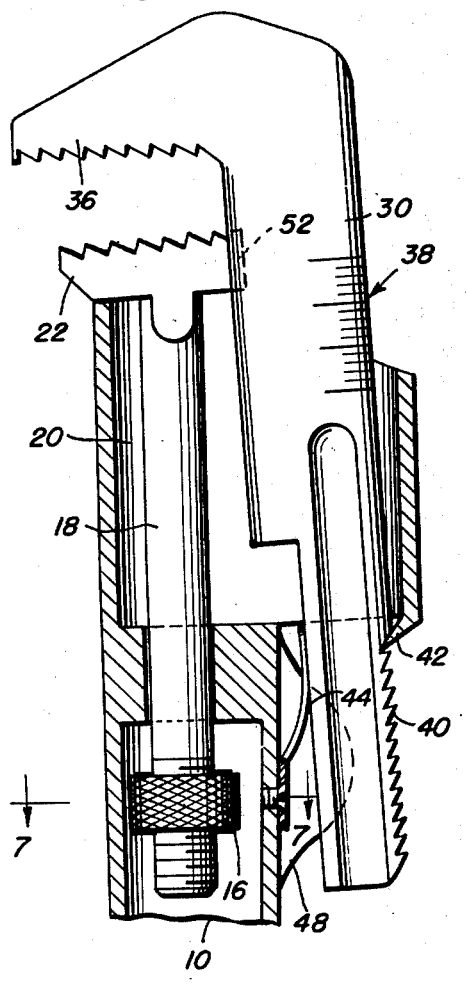
Figure 3 is a sectional view illustrating details of construction.

This invention has been developed in order to provide a device for more effectively clamping and turning pipes, pipe fittings and any other element wherein it is desired to apply torque to that particular element either for fastening or unfastening purposes.

The operating principle of the invention is to provide a pair of shanks, both of which are generally axially adjustable both in unison and relative to each other in order that various adjustments may be effected. The first shank is axially adjustable by means of a threaded collar cooperating with a threaded shank, while the second shank is rockingly supported in a housing. An operating latch cooperates with a recess in the second shank in order to maintain this second shank in the selected rocked position thereby maintaining a rack in operative engagement with a locking lug. When it is desired to axially adjust the second shank, the locking device is released and the second shank is urged against the biasing force of a spring and simply slid axially from or into the housing until the desired height is maintained (relative to the jaw on the first shank). The locking pin or device is then returned and the second shank is in the desired position relative to the housing and handle of the tool.

The means for performing the above mentioned function largely forms the invention and consists of the following structure:

A handle portion 10 is provided of any suitable material, preferably metallic and may be solid or hollow as desired. An aperture 12 is provided in the handle 10 and communicates with gradual recessed portions 14 adjacent this aperture. These recessed portions form finger-receiving elements in order that access may be had for an internally threaded collar 16.

This internally threaded collar 16 is of conventional description having serrations or other roughening expedients thereon and is used for the purpose of adjusting a first shank 18 axially of the handle 10. This first shank extends through a housing 20 which may be formed as an integral portion of the handle 10. At one end of the shank 18 there is a first jaw 22 which has teeth thereon, the teeth being conventional in nature. Beneath said jaw 22 is a pair of protuberances 24 and 26, respectively, which seat in notches 28 formed in the upper portion of said housing.

Figure 4:
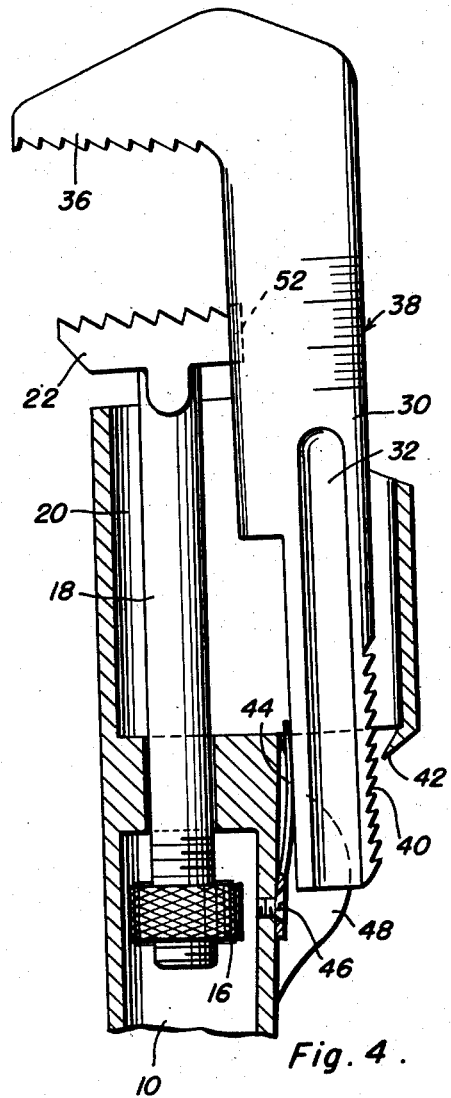
Figure 4 is a sectional view similar to that of Figure 3, showing a second operative position.
Figure 7:
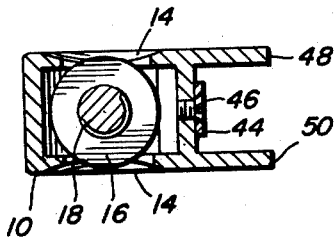
Figure 7 is a sectional view taken on the line 7—7 of Figure 3 and in the direction of the arrows.

Attention is directed primarily to Figures 3 and 4 wherein it is disclosed that said first shank 18 is axially adjustable through the medium of the threaded collar 16 cooperating with the threaded end of the said shank 18. The protuberances 24 and 26 cooperate with the notches 28 in order to form a seat for said first shank 18.

The housing 20 is open at the top and the bottom in order to permit free passage of a second shank 30 therethrough. This second shank 30 has longitudinal grooves 32 and 34, one on each face thereof, and one of which is used in cooperation with a locking device to be described subsequently.

A second jaw 36 is integrally secured to said shank 30 and cooperates with said jaw 22 to form the usual pair of jaws known in the tool art. Suitable indicia generally indicated at 38 is cut or otherwise applied on the shank 30 for cooperation with the upper edge of the housing 20 to indicate the amount that said second shank 30 is extended from the housing.

A rack gear 40 is formed by a plurality of successive teeth on the shank 30 for cooperation with a lug or keeper 42 which is either rigidly secured to or formed as an integral portion of the housing 20. Thus described it is seen that the second shank 30 is rockingly supported within the housing 20 for extensible cooperation with said jaw 22 to form a clamping device.

Means for resiliently biasing the lower end of said second shank 30 is provided on the handle. This means may be in the form of a single leaf spring 44 which is attached to said handle through the medium of a screw 46. The screw is countersunk in order that free passage of the shank 30 is thereby effected. The leaf spring bears on one edge of the shank 30 normally urging said rack 40 into operative engagement with the protuberance or latch keeper 42.

Flanges 48 and 50 respectively, are formed integral with said handle and may be considered as a continuation of said housing 20. These flanges engage the sides of the second shank 30 thereby limiting lateral movement thereof.

It is seen from an inspection of Figures 1, 3 and 4, that said first jaw 22 has the rear portion recessed at 52 in order to slidably accommodate a part of said second shank 30. This construction allows the shank to be guided by its seating arrangement in the recess 52. A locking device is provided on the housing which is manually operative and which cooperates with the groove 32 in order to limit the rocking movement of the second shank 30. This locking device may be seen in Figure 5 as simply an L-shaped pin 56 which has the shorter leg thereof projecting through an opening 58 in one side of the housing 20. An enlargement 62 of opening receives the locking pin therein when it is desired to adjust the second shank 30. As is seen in Figure 1, it is impossible for the second shank 30 to rock a substantial amount as the L-shaped locking pin 56 seats in the groove 32 with the leg of the L-shaped locking pin clampingly engaging the opening 58. However, when it is desired to rock the shank 30 in order that it may be adjusted axially, the locking pin is first slid out of the opening 58 and then moved to the enlargement 62 of the opening. Accordingly, it is only necessary to urge the second shank 30 against the biasing force of the spring 44 in order that the protuberance 42 may be moved to an out-of-contact relation with the rack 40.

A set screw 66 is threadedly received in the housing and engages the locking pin 56 in order that a selected amount of pressure may be applied thereto. This construction obviously permits the locking device to be maintained in place by means of a pre-selected amount of force.

Having described the invention, what is claimed as new is:

1. A wrench comprising a handle having a housing attached thereto, a support having a jaw at one end, means slidably mounting said support in said housing, a guideway in said jaw, a shank rockably positioned in said housing and slidably contacting said guideway, means for locking said shank in selective positions relative to said housing, a second jaw attached to said shank in confronting relation with the first-mentioned jaw, said last-mentioned means comprising rack teeth on said shank, a protuberance attached to said housing and engaging selected rack teeth on said shank, said last-mentioned means further comprising a notch in said housing and adjacent said shank, said notch communicating with a second notch in said housing, said second notch extending transversely to said first-named notch, said shank having a groove therein, a locking pin being slidably disposed in said groove and normally positioned in said first-named notch to maintain said shank in non-rocking position; said locking pin, when slid out of said first-named notch, being free to move into said transverse notch, whereby said shank may be rocked out of engagement with said protuberance and axially shifted with respect to said housing.

2. The combination of claim 1 and a screw threaded into said housing and engaging said locking pin for frictionally seating said locking pin in said groove to thereby retain said locking pin in either of said notches.

SIMON SMITH.

REFERENCES CITED

The following references are of record in the file of this patent:

UNITED STATES PATENTS

| Number | Name | Date |
|---|---|---|
| 231,303 | Franke | Aug. 17, 1880 |
| 584,591 | Johnson | June 15, 1897 |
| 705,060 | Ford | July 22, 1902 |
| 1,125,946 | Bovee | Jan. 26, 1915 |
| 1,637,590 | Robinson | Aug. 2, 1927 |